US010242572B2

(12) United States Patent
Doyle, III

(10) Patent No.: US 10,242,572 B2
(45) **Date of Patent: *Mar. 26, 2019**

(54) SYSTEM AND METHOD FOR MANAGING MOVABLE OBJECTS

(71) Applicant: Omnitracs, LLC, Dallas, TX (US)

(72) Inventor: Marquis D. Doyle, III, Lewisville, NC (US)

(73) Assignee: OMNITRACS, LLC, Dallas, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/965,432

(22) Filed: Aug. 13, 2013

(65) Prior Publication Data

US 2013/0328703 A1 Dec. 12, 2013

Related U.S. Application Data

(63) Continuation of application No. 12/247,095, filed on Oct. 7, 2008, now Pat. No. 8,538,838.

(51) Int. Cl.
*G08G 1/127* (2006.01)
*G08G 1/00* (2006.01)
*B60R 25/10* (2013.01)

(52) U.S. Cl.
CPC ............... *G08G 1/127* (2013.01); *G08G 1/20* (2013.01)

(58) Field of Classification Search
CPC .. G06Q 10/0875; G06Q 10/087; G06Q 10/06; G06Q 40/10; G06Q 30/04; G08G 1/20
USPC ........................................................... 705/29
See application file for complete search history.

(56) References Cited

U.S. PATENT DOCUMENTS

| | | | | |
|---|---|---|---|---|
| 6,442,158 | B1 * | 8/2002 | Beser .................. | H04L 12/2801 370/352 |
| 8,284,037 | B2 * | 10/2012 | Rennie ................... | G08G 1/017 340/426.16 |
| 2007/0035397 | A1 | 2/2007 | Patenaude et al. | |
| 2007/0285241 | A1 * | 12/2007 | Griebenow ............ | G06Q 10/08 340/572.1 |
| 2008/0122622 | A1 | 5/2008 | Archer et al. | |
| 2008/0221827 | A1 * | 9/2008 | Boesch .................. | B60K 6/365 702/146 |
| 2009/0228157 | A1 * | 9/2009 | Breed ................... | B60W 30/16 701/1 |

OTHER PUBLICATIONS

International Search Report and Written Opinion, dated Nov. 13, 2014, issued in PCT/US09/59792.

* cited by examiner

*Primary Examiner* — Garcia Ade
(74) *Attorney, Agent, or Firm* — Arent Fox LLP

(57) ABSTRACT

Systems and methods for managing a plurality of movable objects are disclosed. The systems and methods include determining a proposed pairing of a first movable object and a second movable object and confirming a coupling of the proposed pairing based on, at least in part, detecting that the first movable object and the second movable object are moving in unison.

28 Claims, 7 Drawing Sheets

SYSTEM AND METHOD FOR MANAGING MOVABLE OBJECTS

CLAIM OF PRIORITY UNDER 35 U.S.C. § 120

The present Application for Patent is a continuation of patent application Ser. No. 12/247,095, entitled "SYSTEM FOR PAIRING VEHICLE COMPONENTS," filed Oct. 7, 2008, pending, and assigned to the assignee hereof and hereby expressly incorporated by reference herein.

BACKGROUND

Field

The apparatus, methods, and systems disclosed, illustrated and claimed in this document pertain generally to establishing and maintaining communications links between separable movable objects. More particularly, the new and useful system for pairing vehicle components disclosed and claimed in this document is capable of identifying and authenticating movable objects such as vehicle components to be either physically coupled or physically decoupled, confirming that the correct movable objects have been coupled, and/or confirming that the correct vehicle components have been decoupled. The system for managing vehicle components is particularly but not exclusively useful in one non-exclusive aspect for identifying, authenticating, and confirming physical coupling and physical decoupling of vehicle components such as tractors and trailers.

Background

Mobile asset management is a major concern in various transportation industries such as trucking, railroad, industrial equipment, and similar industries. In the trucking industry, for example, an asset manager may desire to track the status and location of several tractor and trailer assets that are included within the scope of the term "vehicle components" in this document.

An asset manager may want to know whether a vehicle component is in service, where the vehicle component is located, as well as a wide range of status questions in connection with one or more vehicle components (collectively, "vehicle status"). If an asset manager is able to collect reliable information about the vehicle status of vehicle components, an asset manager can confidently monitor, arrange for, and confirm accurate and correct pairing of vehicle components. Without such reliable information, confusion and error is likely in connection with efforts associated with pairing of vehicle components.

Presently, however, consistently reliable and accurate identification and authentication of pairing status of vehicle components by an asset manager is not always possible. In addition, consistently accurate confirmation about either physical coupling, or about correct decoupling, is not possible. These limitations of the current state of the art are the result of at least the following factors.

Basic communication between movable objects such as tractors and trailers often is unreliable. Several methods in current use provide basic, low bandwidth data communication using one or more dedicated wires, a power line communications configuration, and/or a short range wireless link. However, those systems may be unreliable and often are proprietary. If proprietary, communication failures may occur between and among vehicle components equipped with communication apparatus from different sources. To achieve the pairing goals of an asset manager, movable objects such as a tractor and trailer must have, or be able to establish, reliable and consistently operable electrical connections between the vehicle components, or, in the case of some wireless apparatus, be in close proximity, and have compatible devices installed to be able to communicate.

Another problem is pairing uncertainty using short range wireless links such as radio frequency, acoustic, and/or infrared systems. The short operational range of such systems is a significant limitation. Assuming that a tractor initiates a request for authentication as a prelude to physical coupling with a specific trailer, there may be in the vicinity of the tractor a number of other trailers within wireless range that are equipped with compatible asset tracking units, each suggesting it is the "correct" (but actually is incorrect) trailer to be physically coupled.

Similarly, if a tractor is in fact correctly identified for physical coupling with the proper intended trailer, those charged with accomplishing the physical coupling may err by coupling the tractor to an incorrect trailer, a result undetectable until after the tractor has moved from its location with the unintended trailer.

SUMMARY

The solution to the range of problems encountered in seeking to correctly pair moveable objects such as tractors and trailers is disclosed, illustrated and claimed in this document as a system for pairing vehicle components, a system that results in additional unanticipated capabilities.

The systems, methods, and apparatus disclosed, illustrated and claimed in this document achieve reliable communication links between physically separated objects. As a consequence, at least one capability of the new and useful systems, methods, and apparatus is accurate identification and authentication of objects to be physically coupled and/or decoupled, and confirmation of accurate physical coupling and decoupling of the objects.

In one non-exclusive aspect, therefore, disparate vehicle components may be identified and authenticated as being the correct vehicle components intended to be physically coupled. Following physical coupling, communications links are used to confirm that the correct vehicle components have been coupled. In addition, continued physical coupling can be confirmed. Likewise, proper decoupling of the vehicle components can be confirmed.

These advances in the art are achieved by providing a virtual data communication link between one or more location determination devices, such as asset tracking units that are located on moveable objects such as tractors and trailers. The asset tracking units may be operatively connectable to one or more integrated wireless equipment management systems. Such integrated wireless equipment management systems provide the capability of being operatively connectable to one or more remote servers. The one or more remote servers may be located at a wireless base station (in this document, a "network management center") to assist in substantially continuously and automatically receiving and transmitting location information related to tractors and trailers monitored by the wireless base station or network management center.

In addition to the primary capabilities of the system, the current uncertainty about the accuracy of physical coupling and decoupling of objects resulting from use of short range wireless links between objects such as vehicle components is overcome by establishing a short range data link if a short range data link is needed.

The virtual data communications link and the short range data link, if necessary, either separately or in combination, use one or more algorithms and methods to substantially automatically reconfigure communications data to achieve the capabilities described in this document.

As indicated, in at least one aspect of the system for pairing vehicle components, a virtual data communication link is established between one or more asset tracking units located on moveable objects such as vehicle components. The asset tracking units are operatively connectable across an integrated wireless equipment management system. A further advancement in the art is achieved by establishing a virtual data connection between the asset tracking units across the integrated wireless equipment management system. Further, if the one or more algorithms for creating the virtual data communication link between one or more mobile wireless communication instruments determine a need for a virtual data communications link, the integrated wireless equipment management system is programmable to create the virtual data communication link on demand.

Additional benefits are achieved by the system for pairing vehicle components that include, but are not limited to:

The system provides communication between a specific tractor and a specific trailer regardless of the distance of physical separation between the tractor and the trailer.

The system provides a communications link between a specific tractor and a specific trailer although the electronics associated with the asset tracking units and installed on the vehicle components may be supplied by different vendors, and although the installed electronics and associated communications systems may be different or disparate.

Means are provided for communications between a specific tractor and a plurality of specific trailers in recognition that some tractors may haul multiple trailers and/or multiple equipment components.

The system provides a way to validate either that a tractor has coupled with the intended trailer, or has coupled with an unintended trailer.

Management tools provided by the system include the capability of detecting and validating that a tractor has decoupled from a trailer at an intended location.

The system provides a way to direct a tractor to one or more intended vehicle components for coupling or hitching.

Another management tool includes the capability to determine actual tractor and trailer pairings while providing communication links between those paired tractors and/or trailers.

The system also provides a management tool for providing authentication necessary to establish a short range wireless link between a tractor and a trailer, or between one or more equipment components and/or vehicle components.

The system for pairing vehicle components also is fully adaptable for use with existing systems already used by asset managers to monitor vehicle component status. To assist and enable an asset manager to monitor remote vehicle status and vehicle components, a system for at least two-way communications between one or more wireless base stations also referred to as network management centers, which may be operated and monitored by a vehicle dispatcher, or asset manager, and one or more vehicle components, has been developed.

To enhance (i) communications between vehicle components and the network management center, (ii) data development, (iii) data storage, and (iv) receipt and transmission of data, information and reports between vehicle components and a network management center, a variety of location determination systems are available to provide location information. The capabilities of the combination of a network management center and a location determination system may include the ability to track and collect vehicle data, the location of a remote vehicle and one or more vehicle components, and similar objectives critical to asset management. The integrated wireless equipment management system also allows an asset manager to monitor and gather information about various problems confronted by vehicle operators in connection with operation of a remote vehicle along a transportation network, such as identifying the location of remote vehicles and one or more vehicle components and, as disclosed, illustrated, and claimed in this document, pairing vehicle components.

Exemplary integrated wireless equipment management systems that provide at least location information in connection with an asset tracking unit mounted on a tractor or trailer and a network management center using location information obtained from a location determination system include the QUALCOMM® Mobile Computing Platform and QUALCOMM Incorporated's T2 Untethered TrailerTRACS™ Asset Management System (in this document referred to as an "integrated wireless equipment management system"). Constituent components of an integrated wireless equipment management system are mountable on a vehicle or on vehicle components, as well as at the network management center, and also may be operatively connectable across a wireless communications system.

An integrated wireless equipment management system may be operatively connected to a terrestrial location determination system, or to an SPS or GPS system, or to a combination of both location determination systems. The integrated wireless equipment management system may include a range of capabilities. QUALCOMM Incorporated's T2 Untethered TrailerTRACS™ Asset Management System, for example, is capable of processing and managing message traffic at least between a customer and a trailer/container. The T2 system includes QUALCOMM Incorporated software and other sourced software used by the customer and asset manager to receive and send information over the wireless network, and may also perform a range of additional functions via the Internet. In addition, a mobile wireless communications system also provides alternative channels of communications allowing use of conventional laptop computers.

However, at least one unmet demand of asset managers is for a new and useful system for accurately locating and pairing vehicle components, however disparate, and regardless of the distance separating the vehicle components, and despite the fact that communications systems between vehicle components are dissimilar.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the system for pairing disparate vehicle components will become apparent to those skilled in the art when read in conjunction with the following description, drawing figures, and appended claims.

The foregoing has outlined broadly the more important features of the system for pairing vehicle components to better understand and appreciate the detailed description that follows, and to better understand the contributions to the art. The system for pairing vehicle components is not limited in application to the details of construction, and to the arrangements of the components, provided in the following description and drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems for pairing movable objects. The claims, therefore, include equivalent constructions. Further, the abstract associated with this disclosure is intended neither to define the system for pairing disparate vehicle components, which is measured by the claims, nor intended to limit the scope of the claims.

The novel features of the system for pairing disparate vehicle components are best understood from the accompanying drawing, considered in connection with the accompanying description of the drawing, in which similar reference characters refer to similar parts, and in which:

Figure 1A:
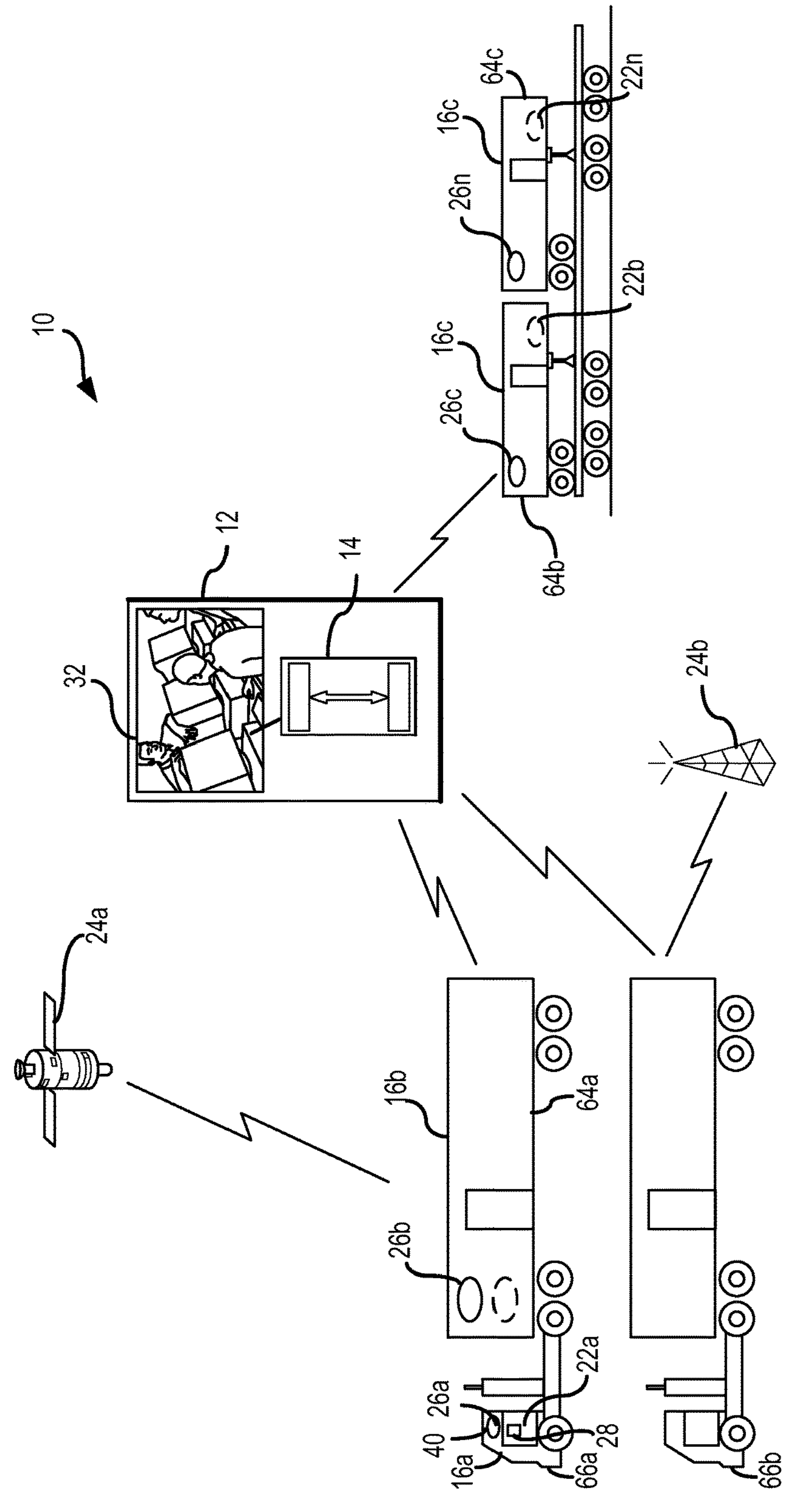
FIG. 1A illustrates the system for pairing vehicle components in an operative environment.

To the extent that the numerical designations in the drawing figures include lower case letters such as "a,b" such designations include multiple references, and the letter "n" in lower case such as "a-n", is intended to express a number of repetitions of the element designated by that numerical reference and subscripts.

DETAILED DESCRIPTION

Definitions

The term "integrated wireless equipment management system" means at least the QUALCOMM® Mobile Computing Platform, but also includes any similar system capable of tracking a vehicle component by mobile two-way satellite and/or terrestrial means, such as the QUALCOMM® T2 system.

The term "network management center" means at least one or more customer base stations that may be operated and monitored by a vehicle dispatcher or asset manager, and one or more vehicle components, across an integrated wireless equipment management system.

The term "asset manager" means a user of the system described, illustrated, and claimed in this document, including subscribers to an integrated wireless equipment management system, and any agent designated by the subscriber.

The term "coordinates" means any set of numbers or other data used to specify the geographic location of a point on a line, surface, or in space, such as the location of vehicle components.

The term "location determination system" means any individual or combination of methods and apparatus used with (a) terrestrial location determination systems and with (b) various satellite positioning systems ("SPS"), such as the United States Global Positioning System ("GPS"), the Russian Glonass system, the European Galileo system, any system that uses satellites from a combination of satellite systems, or any satellite system developed in the future. Furthermore, the disclosed method and apparatus of this document may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and others.

The term "vehicle data" and/or "remote vehicle data" means information about a vehicle including at least, but not limited to, a geographical location, including geographical coordinates among other position location indicators.

The term "vehicle" as used in this document means motorized vehicles including trucks, cars, and trains, ships, boats, and the like, and the term "vehicle components" means not only a motorized vehicle, but also associated components attachable and decouplable from a vehicle, such as containers, trailers, heavy equipment transported on trailers and flatbeds, and similar assets. Thus, the term "vehicle components" means a tractor, trailer, and similar movable assets in various transportation industries such as trucking, railroad, industrial equipment, and similar industries.

The term "remote" means an object like a vehicle that is removed in space from another systemically interrelated but distant object or objects like an asset manager using an integrated wireless equipment management system.

The term "disparate" as used in this document in connection with moveable objects such as, in one aspect, tethered or untethered vehicles, tractors, trailers and containers mountable on trailers, means not only different, but includes also markedly unrelated objects that may not be manufactured by the same manufacturer; may not be in close proximity to each other; may not share common or compatible communication and/or linking devices, apparatus, or systems; may be located in different and varying geographic locations; may use different and mutually exclusive proprietary communication and/or linking devices, apparatus, or systems; and but for the invention disclosed, illustrated and claimed in this document, could not be identified and paired or coupled with consistent accuracy. Accordingly, "disparate" may refer to different moveable objects such as a tethered or untethered vehicle, a tractor, a trailer, and/or a container mountable on a trailer that share a common manufacture source and share similar communication and/or linking devices, apparatus, or systems. However, as indicated, disparate objects also may share no common pairing or coupling feature.

The terms "pair" or "paired" and/or "pairing" mean at least to couple or join physically moveable objects, such as, for example, coupling a specific tractor with a specific trailer and/or container. The terms also mean to establish a wireless communications link between moveable objects such as one or more specific tractors and one or more specific trailers and/or containers, whether physically coupled or decoupled. The terms also mean to account for one or more movable objects, such as a moveable object like a tethered or untethered vehicle, tractor, trailer and/or container.

The teen "pin location" means the location of the attachment point on a trailer that latches to or connects to a truck for coupling. The pin location is the single pivot point between the tractor and the trailer when the two vehicle components are coupled or attached.

The term "slide location" means the location of the attachment point on a tractor that is latched to or connected to the pin.

The term "on-board computer" refers generally to a computer installed on a vehicle component such as a tractor that is capable of running all mobile applications of an integrated wireless equipment management system of the kind described in this document.

As used in this document the term "exemplary" means serving as an example, instance, or illustration; any aspect described in this document as "exemplary" is not intended to mean preferred or advantageous over other aspects of the invention.

DESCRIPTION

As illustrated in the accompanying drawing FIGS. 1A-6, a system for managing movable objects such as vehicle components is provided that in its broadest context includes one or more asset tracking units mounted on the movable objects. In the case of vehicle components, the asset tracking units are operatively connected to a network management center across an integrated wireless equipment management system. In the network management center and on the asset tracking units of the plurality of movable objects, such as tractors and trailers, a protocol such as an algorithm is stored in a data processing system that is capable of creating a virtual data connection between the one or more asset tracking units for accurately identifying and authenticating the movable objects, regardless of (i) the distance between the plurality of movable objects, (ii) how disparate the movable objects are, and (iii) how different the asset tracking units are. The system also is capable of overcoming pairing uncertainty resulting from short-range wireless communications links by establishing a short-range data link between the vehicle components if needed. Accordingly, the virtual data communications link and the short range data link may operate separately or in combination to reconfigure communications data to identify and authenticate vehicle components to be physically coupled and decoupled, and to confirm correct coupling and decoupling.

Figure 1B:
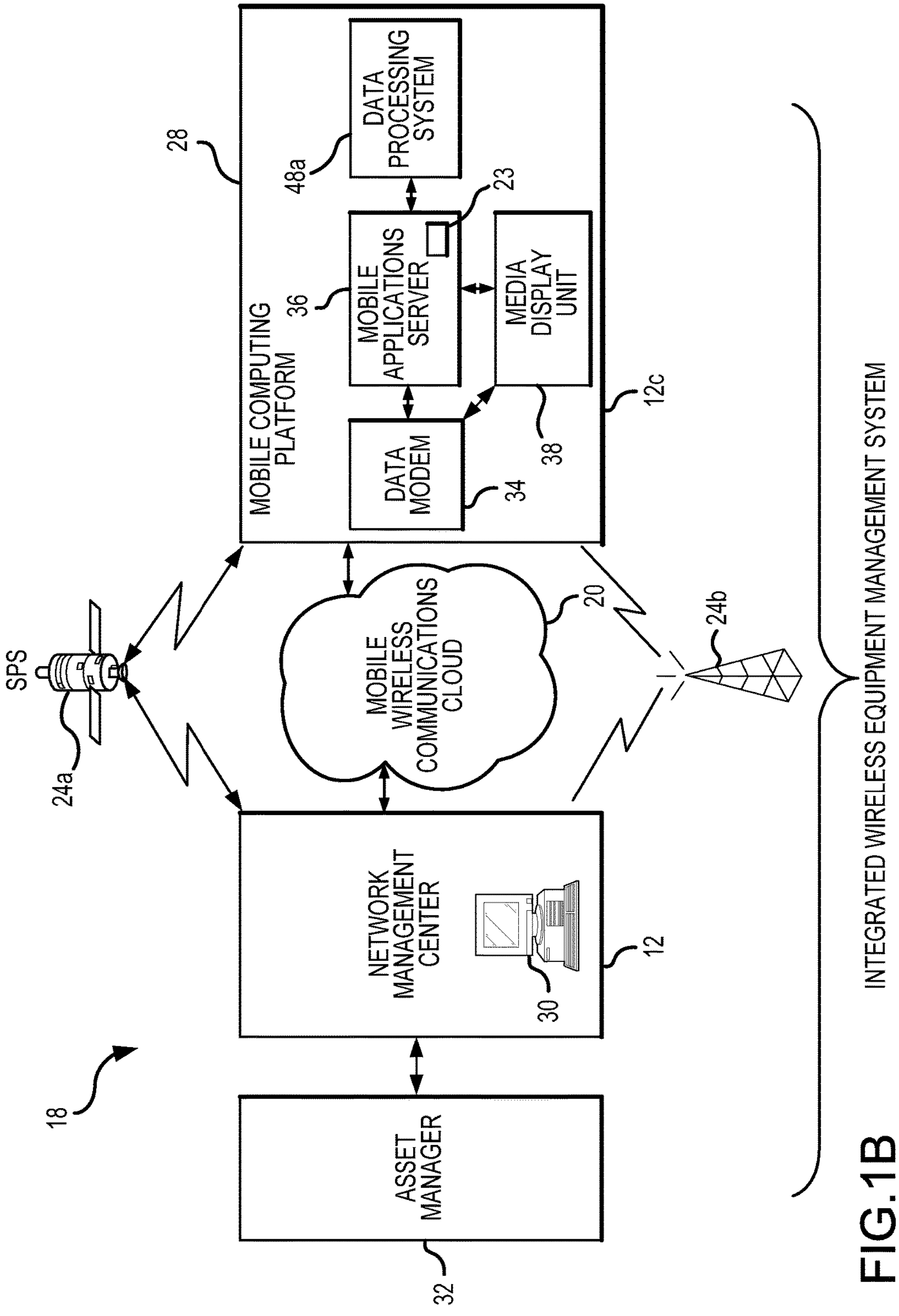
FIG. 1B of the drawing is a block diagram of an integrated wireless equipment management system.

More specifically, as illustrated by cross-reference between FIGS. 1A-1B, a system for pairing vehicle components 10 includes a network management center 12 having one or more data processing systems 14 operatively connectable to vehicle components 16*a-n*. The system includes an integrated wireless equipment management system 18 with components mountable in part on the vehicle components 16*a-n* and operatively connectable to the network management center 12 across a mobile wireless communications cloud 20. In addition, an asset tracking unit 22*a-n* is locatable on each vehicle component 16*a-n*. An executable program is provided that is capable of processing data to establish a compatible communications connection between the asset tracking units 22*a-n* located on the vehicle components 16*a-n*. The executable program is illustrated diagrammatically in FIG. 1B as reference character 23 for illustration purposes only. The executable program 23 is designed and adapted to correctly pair the vehicle components 16*a-n*. In addition, as also illustrated in FIGS. 1A-1B, the location determination system 24*a,b* includes a receiver 26 operatively connected to a mobile computing platform 28 located on at least one of the vehicle components 16*a-n*, and also is operatively connectable across the wireless communications cloud 20.

The integrated wireless equipment management system 18 may consist of the QUALCOMM® Mobile Computing Platform, but may also include QUALCOMM Incorporated's OMNITRACS® Mobile Communications System, and QUALCOMM Incorporated's T2 System for terrestrial wireless communications, among others. As indicated, the SPS and GPS and terrestrial location determination systems 24*a,b* may operate alone or in combination to achieve the objectives of the system for pairing vehicle components 10.

As also illustrated by cross-reference between FIGS. 1A and 1B, a system for pairing vehicle components 10 also includes a mobile computing platform 28. The mobile computing platform 28 is mounted on the remote vehicle component 16*a*, for example, and is shown diagrammatically in FIG. 1A for illustrative purposes only. As further illustrated by cross-reference between FIGS. 1A and 1B, the mobile computing platform 28 mounted on vehicle component 16*a* is operatively connectable across the wireless communications cloud 20. As also illustrated by cross-reference between FIGS. 1A-1B, the mobile computing platform 28 and computer elements 30*a-n* of the asset manager's 32 network management center 12 are capable of storing in memory at least varying coordinates that identify changing locations of a vehicle component 16*a-n*.

As further illustrated by cross-reference between FIGS. 1A and 1B, the mobile computing platform 28 may include a data modem 34, a mobile applications server 36, and a media display unit 38 mounted in the remote vehicle component 16*a* for viewing by an operator of the remote vehicle component 16*a*. Either alone or in combination, the data modem 34, mobile applications server 36, and/or the media display unit 38 may act as, or support, the asset tracking units 22. The data modem 34 includes an antenna 40 capable of receiving and transmitting messages and signals to the mobile application server 36 across the wireless communications cloud 20 illustrated diagrammatically in FIG. 1B. Antenna 40 may be housed adjacent to the position determination receiver 26 as illustrated in FIG. 1A. As a person skilled in the art will appreciate, however, the location of the position determination receiver 26, as well as the other electronic components disclosed in this document, is not a limitation of the system for pairing vehicle components 10.

The mobile application server 36 is capable of receipt and transmission of at least data and information relating to location of the vehicle components 16*a-n*. The mobile application server 36 is not limited to capabilities described in this document, and may include a plurality of programmable general-purpose computers and/or data processing systems 42, described in greater detail in FIG. 2, capable of receiving, storing, processing and transmitting a wide range of data and information to an asset manager 52 about remote and vehicle components 16*a-n*. Although not shown, the mobile computing platform 28 may also include an optional compact display unit, a remote control unit, and at least one speaker to enhance receipt and transmission of data and information across the wireless communication system 20. The media display unit 44, and any additional units such as an optional compact display unit (not shown), enable a vehicle operator and/or a vehicle passenger to communicate with at least one asset manager 38 as illustrated in FIG. 1A.

Both in the mobile computing platform 28, and in the network management center 12 where the asset manager 32 monitors data and information received, stored, and processed in connection with the location of vehicle components 16*a-n* provided by the location determination systems 24*a,b*, a number of computer assisted elements 30 may be included. As illustrated by cross-reference between FIGS. 1B and 2, wireless communications system 20 and/or mobile computing platform 28 and/or computer elements 30 include a data processing system 42. As illustrated, the data processing system 42 may include a variety of components to enable the integrated wireless equipment management system 18 to send and receive location data and information to and from the asset manager's network management center 12 to enable an asset manager 32 to monitor at least one vehicle component 16*a-n*. A person skilled in the art will appreciate that all information and data generated, received, stored, processed and transmitted between the on-board computing platform 28 of the integrated wireless equipment management system 18 may be received, stored, processed, and transmitted to a computer or similar apparatus.

Figure 2:
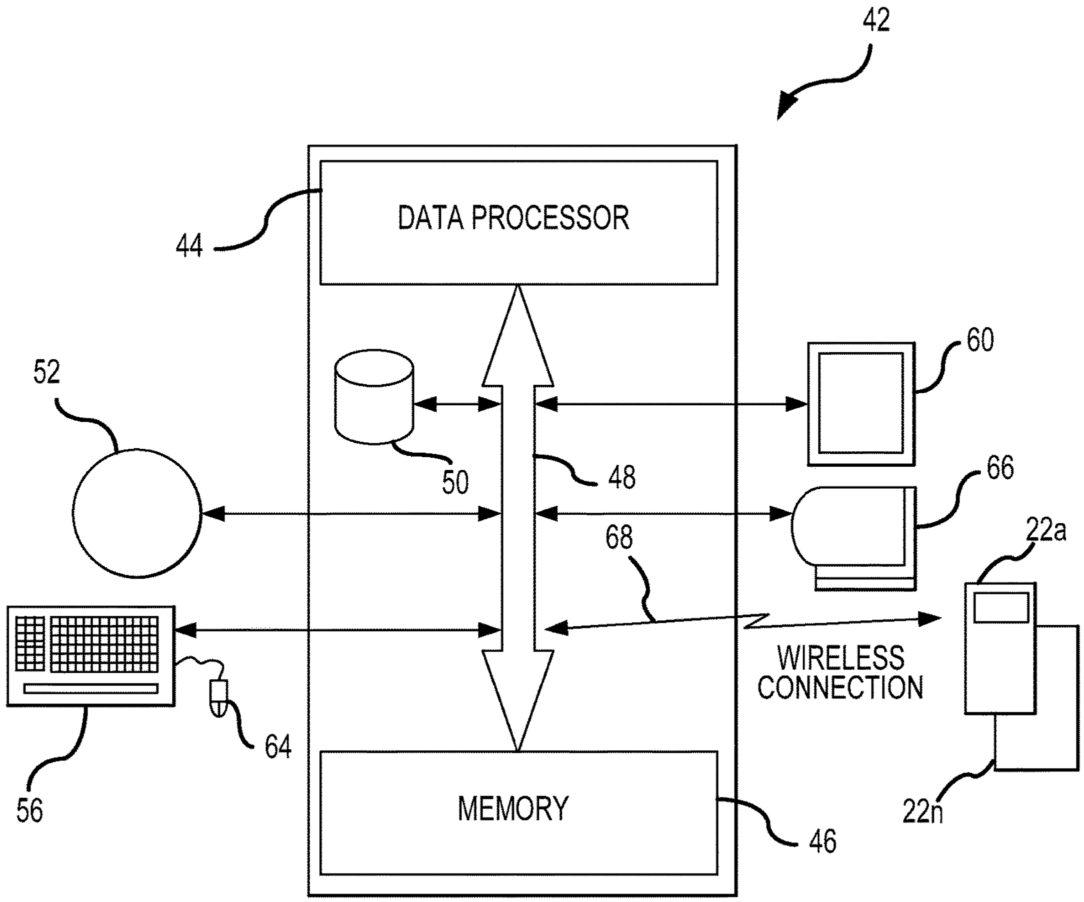
FIG. 2 illustrates a general data processor system whose components may be used in connection with the system for pairing vehicle components.

As illustrated in FIG. 2, the data processing system 42 includes a data processor 44 and a memory 46. A bus 48 connects the data processor 44 and memory 46. Memory 46 is a relatively high-speed machine-readable medium and may include volatile memories such as DRAM, and SRAM, or maybe non-volatile memories such as ROM, FLASH, EPROM, EEPROM, and bubble memory. Also connectable to or across computer bus 48 are optional secondary storage 50, external storage 52, and output devices such as a monitor 54. In further optional configurations, an input device such as a keyboard 56 with a mouse 58, and perhaps a printer 60 may be included. Secondary storage 50 may include machine-readable media such as a hard disk drive, a magnetic drum, and bubble memory (not shown). External storage 52 may include machine-readable media such as a floppy disk, a removable hard drive, a magnetic tape, CS-ROM and even other data processors (not shown) connected across a wireless communications link 62 to one or more assets tracking units 22*a-n*.

The distinction between secondary storage 50 and external storage 52 is primarily for convenience in describing the various components of the data processor 44. As such, a person skilled in the art will appreciate that there is substantial functional overlap between and among the components. Data processor software and user programs may be stored in a software storage medium such as memory 46, secondary storage 50, and external storage 52. Executable versions of data processor software can be read from a storage medium such as non-volatile memory, loaded for execution directly into volatile memory, executed directly out of non-volatile memory, or stored in the secondary storage 50 prior to loading into volatile memory for execution.

Accordingly, in combination the integrated wireless equipment management system 18, the asset tracking units 22, and the data processing system 42 (the latter being located in computer elements 30 of the network management center 12 and on the vehicle components 16*a-n*) function, in operation, to receive, collect, share, process and transmit at least location data and information related to the location of the vehicle components 16*a-n*

Those of skill in the art also will appreciate that the various illustrative logical blocks, modules, circuits, and algorithm steps described in connection with the aspects disclosed in this document may be implemented as electronic hardware, computer software, or combinations of both. To clearly illustrate this interchangeability of hardware and software, various illustrative components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

One or more algorithms associated with the mobile computing platform 28 illustrated in this document may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor so the processor may read information from, and writes information to, the storage medium. In the alternative, the storage medium may be integral to the processor. The processor and the storage medium may reside in an ASIC. An ASIC, if used, may reside in the mobile computing platform. In the alternative, the processor and the storage medium may reside as discrete components in any component of the mobile computing platform.

Any machine-readable medium tangibly embodying instructions may be used in implementing the methodologies described in this document. As a non-exclusive example, protocols, executable programs 23, and related software codes may be stored in a memory 46 or database as illustrated in FIG. 2, and executed by a data processor 44, for example a microprocessor of the mobile applications server 36. Memory may be implemented within the data processor 44 or external memory 52. As used in this document, the term "memory" refers to any type of long term, short term, volatile, nonvolatile, or other memory and is not to be limited to any particular type of memory or number of memories, or type of media upon which memory is stored.

In operation, it will now be evident that the system for pairing vehicle components 10 is applicable in the broader sense for locating and pairing a plurality of movable objects including, without limitation, vehicle components 16*a-n*. As illustrated, a method of locating and pairing a plurality of movable objects such as vehicle components 16*a-n* includes the step of equipping the plurality of movable objects 16*a-n* with one or more asset tracking units 22*a-n*.

In addition, at least one protocol, generally in the form of an executable program 23, capable of processing location data received across the integrated wireless equipment management system 18 and stored either in the network management center 12 and in one or more asset tracking units 22*a-n* on the plurality of movable objects 16*a-n*, provides for accurately locating and pairing the movable objects 16*a-n* regardless of the physical distance between the plurality of movable objects 16*a-n*, and regardless how disparate the movable objects 16*a-n* may be. Thus, the protocol is capable of establishing a compatible communications connection and link between the asset tracking units 22*a-n* located on the plurality of movable objects 16*a-n*.

The actual communications connection for receipt and transmission of data may be any structure or architecture necessary for operation of the asset tracking units 22*a-n*. The decision will be based largely on expected data flow and coverage requirements. For example, a trailer 64*a-n* as illustrated in FIG. 1A may only need connectivity while in a storage yard, a circumstance in which WiFi would suffice. However, other applications may require wider area coverage. Still other applications may require the ubiquitous coverage of a satellite system 24*a*. When a wireless connection is established between the one or more asset tracking units 22*a-n* located on the vehicle 16*a* and vehicle components 16*b-n*, the network management center 12, as illustrated in FIG. 1A, is capable of communicating with, monitoring, and managing location data received from and/or directed to a tractor 72 and/or trailer 70.

As indicated, the system for pairing vehicle components 10 includes a protocol, generally in the form of one or more executable programs 23, capable of processing location data received across the integrated wireless equipment management system 18 to establish a compatible communications link between the asset tracking units 22*a-n* located on the vehicle components 16*a-n*. The executable program 23 is adapted to correctly pair the vehicle components 16*a-n*, regardless of how disparate the equipment, and regardless of how distant the vehicle 16*a* and vehicle components 16*b-n* may be before the program 23 is applied to a specific task.

Figure 3:
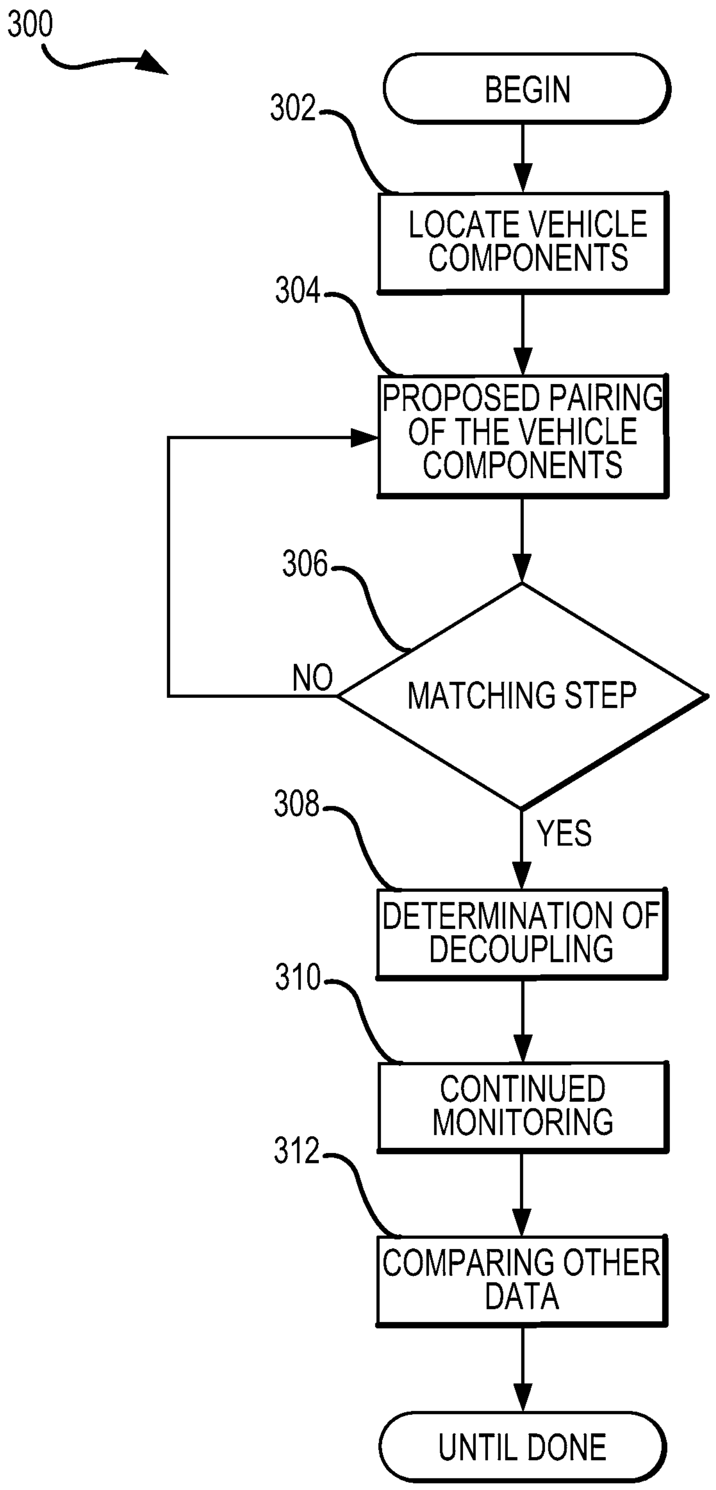
FIG. 3 is a flowchart illustrative of steps in an executable program included in the system for pairing vehicle components.

Thus, as illustrated in FIG. 3, a flowchart of a representative example of an executable program 23 is presented for illustrative purposes to show establishment of a virtual data communications link. The steps of the flowchart are illustrated in general as a method 300. In operation, the step-by-step method 300 is capable of creating a virtual data communications link using one or more data processing systems 42 of the kind illustrated in FIG. 2. In addition, the steps of method 300 are capable of using a short range wireless link, if necessary, to establish communication between vehicle components 16*a-n* for purposes of at least identifying, authenticating, and confirming the correct vehicle components 16*a-n* to by physically coupled and/or physically decoupled. The steps of method 300 are as follows, and will be understood best by reference to FIG. 3.

As illustrated in FIG. 3, at step 302 the system locates vehicle components 16*a-n*, regardless of how disparate the vehicle components 16*a-n* may be, and regardless of the distance between or among vehicle components 16*a-n*. The network management center 12, computer elements 30, one or more data processing systems 14 or 42, and the integrated wireless equipment management system 18, either alone or in combination, identify the coordinates of the location of vehicle components 16*a-n* using the location determination system 24 appropriate for the application. For example, the pin location (not shown) of an intended trailer 64*a-c* and the slide location (not shown) of the intended tractor 66 may be determined at authentication step 304. The pin location of the trailer 64*a-c* may be determined, for example, by the current antenna location of the antenna 40 associated with the integrated wireless equipment management system 18. The pin location also is determined by data concerning the last direction of movement of the trailer 64*a-c*, as well as by the pin offset distance from the antenna 40. Likewise, the slide location of the tractor 66 may be determined by the current antenna location, the last direction of movement, as well as by the slide offset from the antenna 40.

At step 304, a pairing of vehicle components 16*a-n* is proposed. For example, the network management center 12 determines an intended tractor 66 and trailer 16*c* pairing. With the location information of tractor 66 and trailer 16*c* from step 302, an operator of vehicle 16*a* may be notified using the integrated wireless equipment management system 18.

A preliminary pairing is authenticated at step 306, and the operator of the vehicle 16*a* may be notified by the network management center 12 to proceed with the coupling of the vehicle components 16*a-n* consisting of, in a non-exclusive example, tractor 66 and trailer 64*c*. If, for example, the reported pin location and slide location begin movement in unison, the pairing, in this instance the physical coupling, is conclusively validated. Alternatively, as illustrated by steps 304 and 306, unintended pairings may be similarly detected, and notices sent to the operator of a vehicle 16*a* that tractor 66 and trailer 64*e* are improperly coupled. For example, if a tractor 66 commences movement, but the trailer 64*c* location remains stationary, a notice may be sent to the operator of the vehicle 16*a* from the network management center 12 that an unintended coupling may have occurred.

In another aspect, the coordinates of the location of trailer 64*a-n*, for example, may be retrieved from the database on an on-board computer of the tractor's 66 navigation system 28. The on-board computer of the tractor's 66 navigation system 28 may be part of the integrated wireless equipment management system 18 located on vehicle components 16*a-n*, and capable of establishing a virtual data communications link between the one or more mobile asset tracking units 22*a-n*. The on-board computer is enabled to communicate directly over the virtual data communications link with trailer 64 to request the trailer's location.

The system for pairing vehicle components 10 also determines when and where to physically decouple vehicle components 16*a-n* such as tractor 66 and trailer 64*a-n*. The network management center 12 monitors reported locations of the paired tractor 66*a* and trailer 64*a-n*. As illustrated at step 308 of FIG. 3, if reported locations deviate by a predetermined distance, it can be determined that a physical decoupling event between tractor 66 and a trailer 64*a-n* has occurred, and the coordinates at which the decoupling occurred may be logged across the system using the data communications capabilities of the integrated wireless equipment management system 18. In addition, the fact of the decoupling may be automatically recorded.

At step 306 the network management center 12 also may determine desired pairing of vehicle components 16*a-n* linked for communication purposes across a proprietary short range wireless link, if needed under the circumstances. Consequently, the network management center 12 provides the required authentication and pairing confirmation for short range wireless links to both the tractor 66 and a trailer 64*a-n*. Alternatively, the virtual data communications link established between the tractor 66 and trailer 64*a-n* allows required authentication indirectly over the virtual data communications link between the tractor and trailer. Once a short range wireless link is established, the virtual data communications link may be terminated.

Likewise, as shown in step 310, when and where to decouple vehicle components may also include the steps of monitoring vehicle data to include the location of a paired first vehicle component 16*a* and a second vehicle component 16*n*, and determining from the location of the paired first vehicle component 16*a* and the second vehicle component 16*n* when and where to decouple the first vehicle component 16*a* and the second vehicle component 16*n*.

Because the network management center 12 is capable of monitoring the location of all tractors 66 and trailers 64*a-n* equipped with an integrated wireless equipment management system 18, actual tractor 66 and trailer 64*a-n* pairings may automatically be determined by comparing reported location, speed, and direction information associated with paired vehicle components 16*a-n*. Thus, as illustrated at step 312 of FIG. 3, tractor 66 and trailer 64*a* moving in unison for a predetermined amount of time would be determined as paired. However, as indicated, the virtual data communications link can automatically establish tractor and trailer pairing without the system having prior confirmation of the pairing.

Figure 4:
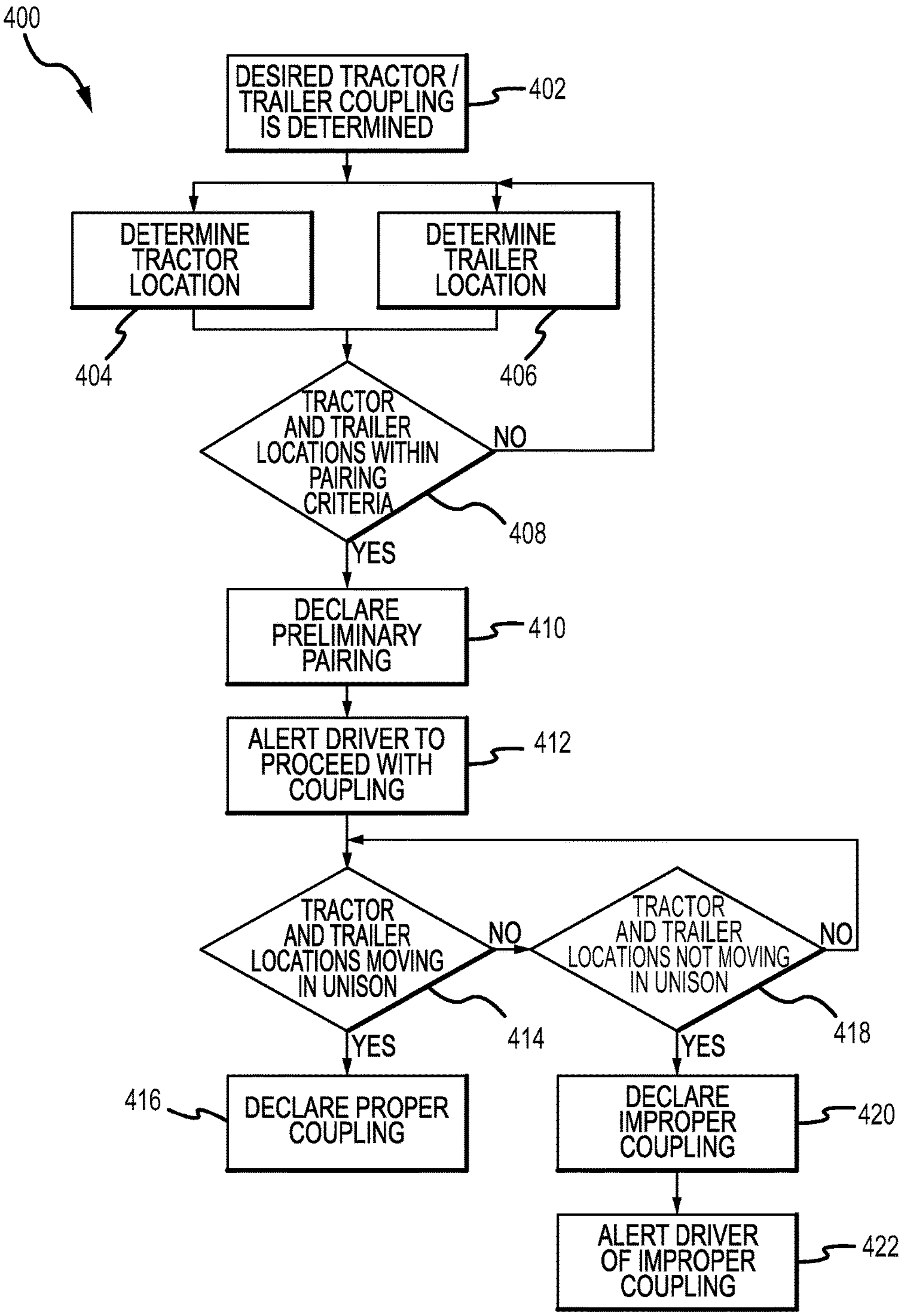
FIG. 4 is a flowchart illustrative of steps in another aspect of the system for pairing vehicle components.

Another aspect of the system for pairing vehicle components 10 is summarized and illustrated in FIG. 4 by a flowchart 400. Flowchart 400 also illustrates establishment of a virtual data communications link as contemplated and disclosed in this document. Accordingly, in operation, the step-by-step method 400 is capable of creating a virtual data communications link using one or more data processing systems 14 or 42*a-n* of the kind illustrated in FIG. 2. In addition, the steps of method 400 are capable of using a short range wireless link, if necessary, to establish communications between vehicle components 16*a-n* at least for purposes of identifying, authenticating, and confirming the correct vehicle components that are to be paired. The steps of method 400 are as follows, and will be understood best by reference to FIG. 4.

As illustrated in FIG. 4, at step 402 a desired tractor and trailer coupling is determined. As indicated in this document, the desired coupling may be determined in the network management center 12. Using any of the location determination systems 24*a,b* described in this document, at step 404 the location of the desired tractor 66 is determined and at step 406 the location of a trailer 64*a-n* is likewise determined. As indicated by the decision symbol of step 408, alternatively the desired coupling of tractor 66 and trailer 64*a-n* may be determined in connection with alternative pairing criteria. In any event, on an identification of the proper tractor 66 and trailer 66*a-n* to be paired, at step 408 the correct co-location of tractor 66 and trailer 64*a-n* is confirmed. As a result, at step 410 a preliminary pairing authentication is declared. Thereafter, using the network management center 12, computer elements 30, one or more data processing systems 42, and the integrated wireless communication system 18, either alone or in combination, an operator of tractor 66 is alerted to proceed with the actual physical coupling. Following confirmation of physical coupling, at step 414 the network management center 12 confirms that tractor 66 and trailer 64*a-n* are moving in unison. Accordingly, the system for pairing vehicle components 10 therefore has identified, authenticated and confirmed physical coupling at step 416. Alternatively, however, if at step 414 it is determined that tractor 66 and trailer 64*a-n* are not moving in unison, as indicated at step 418, the system for pairing vehicle components 10 declares that there has been an improper coupling at step 420. Consequently, the network management center 12 alerts the operator of tractor 66 at step 422 of the improper coupling so that corrective action may be taken.

Figure 5:
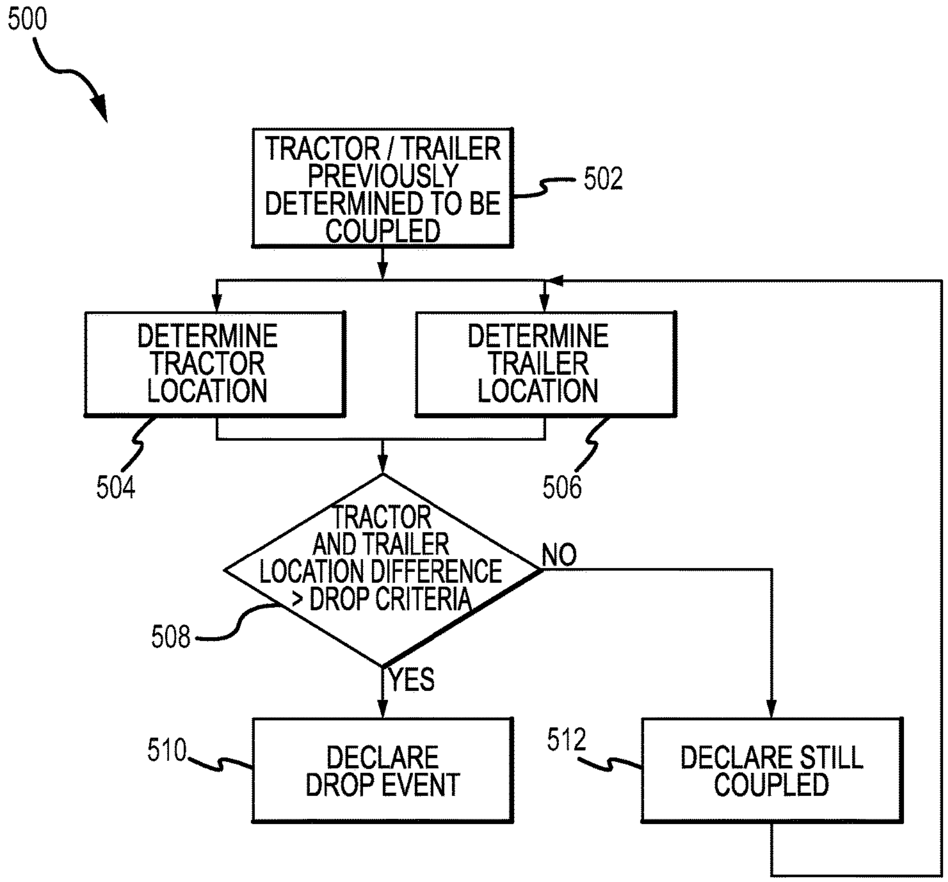
FIG. 5 is a flowchart illustrative of steps in another aspect of the system for pairing vehicle components.

Yet another aspect of the system for pairing vehicle components 10 is illustrated in FIG. 5 using flowchart 500. As illustrated in FIG. 5, at step 502 tractor 66 and a trailer 64*a-n* previously have been determined to be coupled physically. The previous physical coupling is determined by data provided by the network management center 12, computer elements 30, one or more data processing systems 42, and the integrated wireless equipment management system 18, by identifying the coordinates of the tractor 66 and the trailer 64*a-n* using the location determination system 24 that is appropriate under the circumstances, as shown at steps 504 and 506. However, if there is a location difference between tractor 66 and trailer 64*a-n*, then at step 508 the presumption of continued physical coupling between tractor 66 and trailer 64*a-n* is discontinued, and the network management center 12 may declare and determine a drop event, or physical decoupling of tractor 66 and trailer 64*a-n* as shown at step 510. Alternatively, if as a result of the data collected and processed at step 508 the tractor 66 and trailer 64*a-n* are shown to have no difference in location coordinates, then the network management center 12 may declare and determine that the vehicle components continue to be physically coupled.

Figure 6:
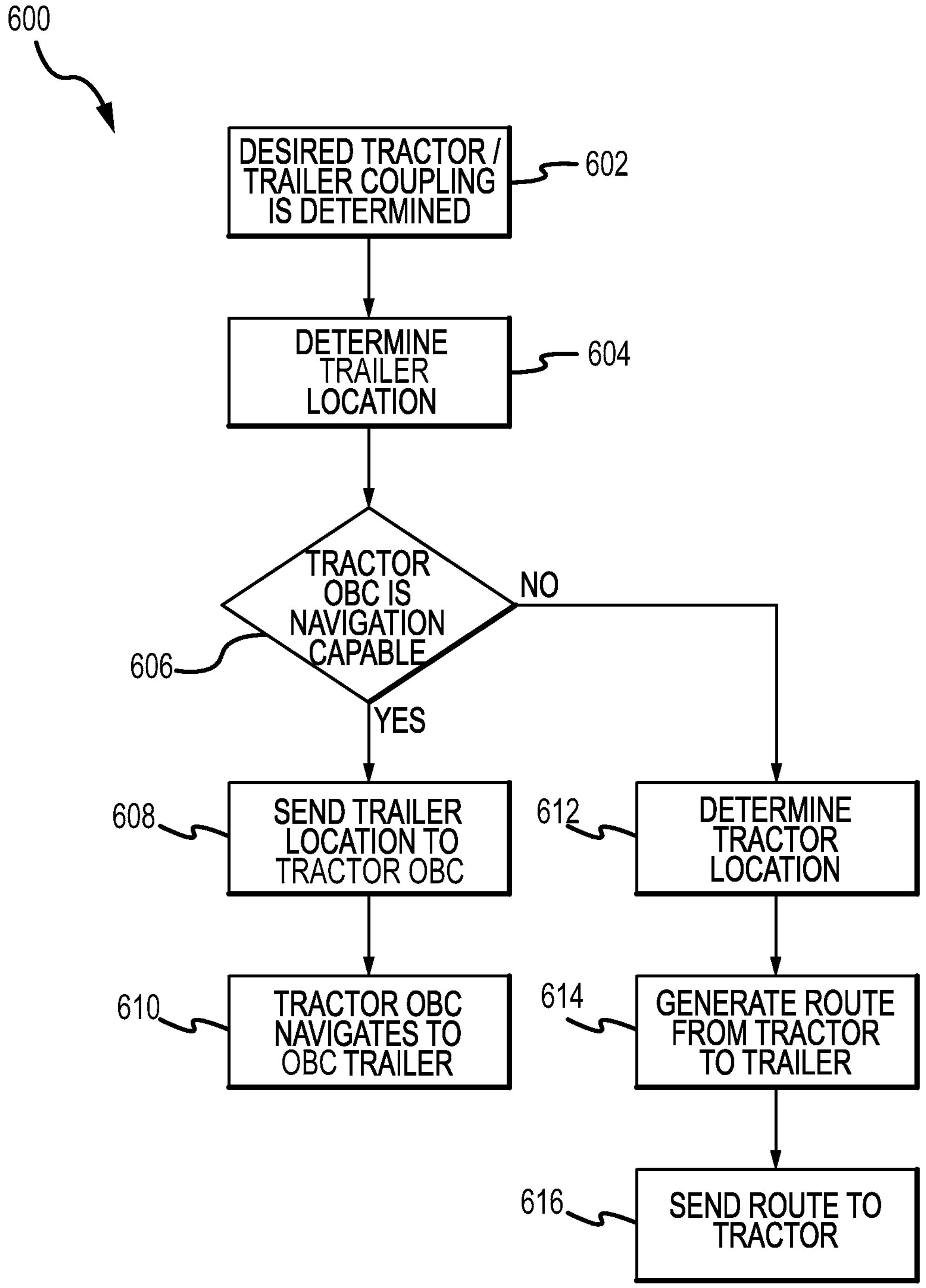
FIG. 6 is a flowchart illustrative of steps in another aspect of the system for pairing vehicle components.

Another aspect of the system for pairing vehicle components 10 is illustrated in FIG. 6. An additional method of the system for pairing vehicle components 10 is shown as a flowchart 600. At step 602, once again a desired coupling of a tractor 66 and a trailer 64*a-n* is determined. Also, at step 604 the location of a trailer 64*a-n* is determined by any one of the apparatus, methods and systems described in this document. In this aspect of the system for pairing vehicle components 10, at step 606 the on-board computer, such as a mobile applications server 36, determines whether tractor 66 is capable of navigation. If so, then at step 608 the location of trailer 64*a-n* is sent to the on-board computer of tractor 66, and as a consequence, at step 610, tractor 66 navigates to trailer 64*a-n*. If, however, at step 606 it is determined that tractor 66 is not navigation capable, then at step 612 the system for pairing vehicle components 10 determines an alternative tractor 66*b* that may be available. Alternatively, the actual position and location of the on-board computer of the tractor 66*b* may be determined at this juncture in the steps to enable pairing of the tractor 66*b* and a trailer 64*a-n*. In addition, the system for pairing vehicle components 10 generates information and data between tractor 66*b* and trailer 64*a-n*. That information and data, including route instructions, are sent to tractor 66*b* as indicated at step 616.

The description of the disclosed aspects is provided to enable a person skilled in the art to make or use the apparatus, system, and method disclosed, illustrated and claimed in this document. Various modifications to these aspects will be readily apparent to those skilled in the art, and the generic principles defined in this document may be applied to other aspects without departing from the spirit or scope of the system for pairing disparate vehicle components system. Thus, the invention is not intended to be limited to the aspects shown in this document, but is intended to be accorded the widest scope consistent with the principles and novel features disclosed in this document.

Claim elements and steps in this document have been numbered solely as an aid in understanding the description. The numbering is not intended to, and should not be considered as intending to, indicate the ordering of elements and steps in the claims. In addition, FIGS. 1A-6 show at least one aspect of the system for pairing disparate vehicle components are not intended to be exclusive, but merely illustrative of the disclosed aspects. As a person skilled in the art will appreciate, method steps may be interchanged sequentially without departing from the scope of the invention.

What is claimed is:

1. A method of locating and pairing a plurality of movable objects in a wireless communications system, comprising:
- locating, by a hardware processor of a computer device, each asset tracking unit mounted on each of the plurality of movable objects, the computer device being connected with a plurality of asset tracking units and location determination systems in the wireless communications system;
- receiving, by a receiver of the computer device, signals broadcast by pseudolites associated with at least one of: a satellite positioning system (SPS), a global positioning system (GPS), or terrestrial location determination systems;
- generating, by the hardware processor, location coordinates of each asset tracking unit based on the signals received from the pseudolites;
- determining a proposed pairing of a first movable object and a second movable object having a first asset tracking unit and a second asset tracking unit, respectively, based on the location coordinates of each asset tracking unit;
- sending, in response to the proposed pairing, a notification to physically couple the first and second movable objects together to enable unison movement of the first and second movable objects; and
- detecting that the first and second movable objects are physically coupled, via the at least one of the SPS, the GPS, or the terrestrial location determination systems, based on a change in the location coordinates of the first and second asset tracking units during the physical coupling indicating that the first and second movable objects are moving in unison.

2. The method of claim 1, further comprising:
- authenticating the proposed pairing by determining that the first movable object and the second movable object are co-located; and
- wherein the sending of the notification to proceed with the physical coupling is based on the authenticating of the proposed pairing.

3. The method of claim 1, wherein confirming the physical coupling further comprises:
- detecting respective movements of a first coupling portion of the first movable object and a second coupling portion of second movable object; and
- wherein the confirming of the physical coupling comprises confirming upon detecting that the respective movements of the first coupling portion and the second coupling portion are moving in unison.

4. The method of claim 1, further comprising:
- detecting, subsequent to the determining of the proposed pairing and before the confirming of the physical coupling, that the first movable object and the second movable object are not moving in unison; and
- sending an improper physical coupling notification based on the detecting that the first movable object and the second movable object are not moving unison.

5. The method of claim 1, further comprising:
- determining, subsequent to the confirming of the physical coupling, that a first location of the first movable object and a second location of a second movable object deviate by a predetermined distance; and
- determining that a physical decoupling event has occurred based on the determining that the first location of the first movable object and the second location of the second movable object deviate by the predetermined distance.

6. The method of claim 5, further comprising determining and storing a location at which the physical decoupling event occurred.

7. The method of claim 1, further comprising:
- equipping the first movable object with the first asset tracking unit and equipping the second movable object with the second asset tracking unit; and
- operatively connecting the first asset tracking unit and the second asset tracking unit to a network management center across the wireless communications system.

8. The method of claim 7, further comprising operatively connecting a location determination system to the first asset tracking unit and the second asset tracking unit, wherein the location determination system is configured to transmit data between the first asset tracking unit and the second asset tracking unit and the network management center.

9. The method of claim 7, further comprising establishing a virtual data connection between the first asset tracking unit and second asset tracking unit.

10. A data processing system for locating and pairing a plurality of movable objects in a wireless communications system, comprising:
- a receiver configured to receive signals broadcast by pseudolites associated with at least one of: a satellite positioning system (SPS), a global positioning system (GPS), or terrestrial location determination systems;
- at least one hardware processor configured to:
  - connect with a plurality of asset tracking units and location determination systems in the wireless communications system;
- locate each asset tracking unit mounted on each of the plurality of movable objects;
- generate location coordinates of each asset tracking unit based on the signals received from the pseudolites;
- determine a proposed pairing of a first movable object and a second movable object having a first asset tracking unit and a second asset tracking unit, respectively, based on the location coordinates of each asset tracking unit;
- send, in response to the proposed pairing, a notification to physically couple the first and second movable objects together to enable unison movement of the first and second movable objects; and
- detect that the first and second movable objects are physically coupled, via the at least one of the SPS, the GPS, or the terrestrial location determination systems, based on a change in the location coordinates of the first and second asset tracking units during the physical coupling indicating that the first and second movable objects are moving in unison.

11. The data processing system of claim 10, wherein the at least one hardware processor is further configured to: authenticate the proposed pairing by determining that the first movable object and the second movable object are co-located, and send the notification to proceed with the physical coupling based on the authenticating of the proposed pairing.

12. The data processing system of claim 10, wherein the at least one hardware processor is further configured to: detect respective movements of a first coupling portion of the first movable object and a second coupling portion of the second movable object, and confirm the physical coupling upon detecting that the respective movements of the first coupling portion and the second coupling portion are moving in unison.

13. The data processing system of claim 10, wherein the at least one hardware processor is further configured to:
- detect, subsequent to the determining of the proposed pairing and before the confirming of the physical coupling, that the first movable object and the second movable object are not moving in unison; and
- send an improper physical coupling notification based on the detecting that the first movable object and the second movable object are not moving in unison.

14. The data processing system of claim 10, wherein the at least one hardware processor is further configured to:
- determine, subsequent to the confirming of the physical coupling, that a first location of the first movable object and a second location of a second movable object deviate by a predetermined distance; and
- determine that a physical decoupling event has occurred based on the determining that the first location of the first movable object and the second location of the second movable object deviate by the predetermined distance.

15. The data processing system of claim 14, wherein the at least one hardware processor is further configured to determine and store a location at which the physical decoupling event occurred.

16. The data processing system of claim 10, wherein the first movable object is equipped with the first asset tracking unit and the second movable object is equipped with the second asset tracking unit.

17. The data processing system of claim 16, further comprising:
- a network management center; and
- a location determination system operatively connectable to the first asset tracking unit and the second asset tracking unit and configured to transmit data between the first asset tracking unit and the second asset tracking unit and the network management center.

18. The data processing system of claim 16, wherein the at least one hardware processor is further configured to establish a virtual data connection between the first asset tracking unit and second asset tracking unit.

19. A non-transitory storage medium containing computer software encoded in machine-readable format for locating and pairing a plurality of movable objects in a wireless communications system, the computer software comprising a set of computer instructions for:
- locating, by a hardware processor of a computer device, each asset tracking unit mounted on each of the plurality of movable objects, the computer device being connected with a plurality of asset tracking units and location determination systems in the wireless communications system;
- receiving, by a receiver of the computer device, signals broadcast by pseudolites associated with at least one of: a satellite positioning system (SPS), a global positioning system (GPS), or terrestrial location determination systems;
- generating, by the hardware processor, location coordinates of each asset tracking unit based on the signals received from the pseudolites;
- determining a proposed pairing of a first movable object and a second movable object having a first asset tracking unit and a second asset tracking unit, respectively, based on the location coordinates of each asset tracking unit;
- sending, in response to the proposed pairing a notification to physically couple the first and second movable objects together to enable unison movement of the first and second movable objects; and
- detecting that the first and second movable objects are physically coupled, via the at least one of the SPS, the GPS, or the terrestrial location determination systems, based on a change in the location coordinates of the first and second asset tracking units during the physical coupling indicating that the first and second movable objects are moving in unison.

20. A method of managing a plurality of movable objects in a wireless communications system, comprising:
- locating, by a hardware processor of a computer device, each asset tracking unit mounted on each of the plurality of movable objects, the computer device being connected with a plurality of asset tracking units and location determination systems in the wireless communications system;
- receiving, by a receiver of the computer device, signals broadcast by pseudolites associated with at least one of: a satellite positioning system (SPS), a global positioning system (GPS), or terrestrial location determination systems;
- generating, by the hardware processor, location coordinates of each asset tracking unit based on the signals received from the pseudolites;
- determining a previous physical coupling between a first movable object and a second movable object having a first asset tracking unit and a second asset tracking unit, respectively, based on the location coordinates of each asset tracking unit; and
- confirming whether the previous physical coupling between the first movable object and the second movable object still exists based on, at least in part, detecting, via the at least one of the SPS, the GPS, or the terrestrial location determination systems, a change in the location coordinates of the first and second asset tracking units indicating whether the first and second movable objects are moving in unison.

21. The method of claim 20, further comprising:
- obtaining, data associated with each of the first movable object and the second movable object, the data comprising location information over time.

22. The method of claim 21, further comprising:
- detecting a decoupling event of the first movable object and the second movable object when the location information of the first movable object and the second movable object deviate by a predetermined distance; and
- detecting that the previous physical coupling between the first movable object and the second movable object still exists when the first movable object and the second movable object are moving in unison based on the location information.

23. The method of claim 22, further comprising recording at least location coordinates of the decoupling event.

24. A data processing system of managing a plurality of movable objects in a wireless communications system, comprising:
- a receiver configured to receive signals broadcast by pseudolites associated with at least one of: a satellite positioning system (SPS), a global positioning system (GPS), or terrestrial location determination systems;

at least one hardware processor configured to:

connect with a plurality of asset tracking units and location determination systems in the wireless communications system;

locate each asset tracking unit mounted on each of the plurality of movable objects;

generate location coordinates of each asset tracking unit based on the signals received from the pseudolites;

determine a previous physical coupling between a first movable object and a second movable object having a first asset tracking unit and a second asset tracking unit, respectively, based on the location coordinates of each asset tracking unit; and confirm whether the previous physical coupling between the first movable object and the second movable object still exists based on, at least in part, detecting, via the at least one of the SPS, the GPS, or the terrestrial location determination systems, a change in the location coordinates of the first and second asset tracking units indicating whether the first and second movable objects are moving in unison.

25. The data processing system of claim 24, wherein the at least one hardware processor is further configured to obtain data associated with each of the first movable object and the second movable object, the data comprising location information over time.

26. The data processing system of claim 25, wherein the at least one hardware processor is further configured to:

detect a decoupling event of the first movable object and the second movable object when the location information of the first movable object and the second movable object deviate by a predetermined distance; and detect that the previous physical coupling between the first movable object and the second movable object still exists when the first movable object and the second movable object are moving in unison based on the location information.

27. The data processing system of claim 26, wherein the at least one hardware processor is further configured to record at least location coordinates of the decoupling event.

28. A non-transitory storage medium containing computer software encoded in machine-readable format for managing a plurality of movable objects in a wireless communications system, the computer software comprising a set of computer instructions for:

locating, by a hardware processor of a computer device, each asset tracking unit mounted on each of the plurality of movable objects, the computer device being connected with a plurality of asset tracking units and location determination systems in the wireless communications system;

receiving, by a receiver of the computer device, signals broadcast by pseudolites associated with at least one of: a satellite positioning system (SPS), a global positioning system (GPS), or terrestrial location determination systems;

generating, by the hardware processor, location coordinates of each asset tracking unit based on the signals received from the pseudolites;

determining a previous physical coupling between a first movable object and a second movable object having a first asset tracking unit and a second asset tracking unit, respectively, based on the location coordinates of each asset tracking unit; and confirming whether the previous physical coupling between the first movable object and the second movable object still exists based on, at least in part, detecting, via the at least one of the SPS, the GPS, or the terrestrial location determination systems, a change in the location coordinates of the first and second asset tracking units indicating whether the first and second movable objects are moving in unison.

* * * * *